United States Patent
Yuhara

(10) Patent No.: US 7,315,233 B2
(45) Date of Patent: Jan. 1, 2008

(54) DRIVER CERTIFYING SYSTEM

(75) Inventor: Masahiro Yuhara, Yokohama (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 408 days.

(21) Appl. No.: 10/931,176

(22) Filed: Aug. 31, 2004

(65) Prior Publication Data

US 2005/0047628 A1    Mar. 3, 2005

(30) Foreign Application Priority Data

Sep. 1, 2003 (JP) ............................. 2003-309290
Jul. 20, 2004 (JP) ............................. 2004-211679

(51) Int. Cl.
*H04N 5/235* (2006.01)

(52) U.S. Cl. .................. 340/5.72; 340/5.53; 340/5.83; 382/117; 307/10.2

(58) Field of Classification Search ............... 340/5.72, 340/5.52, 5.53, 5.82, 5.83, 426.24; 382/115, 382/117, 118; 180/287; 307/10.2
See application file for complete search history.

(56) References Cited

U.S. PATENT DOCUMENTS

| | | | |
|---|---|---|---|
| 5,812,067 A * | 9/1998 | Bergholz et al. ........... 340/5.52 |
| 6,252,978 B1 | 6/2001 | Grantz | |
| 6,400,835 B1 * | 6/2002 | Lemelson et al. .......... 382/118 |
| 6,442,465 B2 * | 8/2002 | Breed et al. .................. 701/45 |
| 7,091,845 B2 * | 8/2006 | Midland et al. ............ 340/500 |
| 2003/0142849 A1 | 7/2003 | Lemelson et al. | |
| 2003/0169213 A1 * | 9/2003 | Spero ............................ 345/7 |
| 2003/0169334 A1 * | 9/2003 | Braithwaite et al. .......... 348/78 |
| 2005/0084137 A1 * | 4/2005 | Kim et al. .................. 382/115 |

FOREIGN PATENT DOCUMENTS

| | | |
|---|---|---|
| DE | 101 13 950 | 9/2002 |
| WO | WO 03/060814 A1 | 7/2003 |

OTHER PUBLICATIONS

EP Search Report corresponding to application No. EP 04 02 0097 dated Dec. 8, 2004.

* cited by examiner

*Primary Examiner*—Edwin C. Holloway, III
(74) *Attorney, Agent, or Firm*—RatnerPrestia

(57) ABSTRACT

The driver certifying system according to the present invention comprises an iris pattern acquiring means 11 for acquiring iris pattern of a driver who sits on a driver's seat of a vehicle, a driver certifying means 12 for certifying whether or not the driver is an authentic driver by comparing the iris pattern with registered iris pattern of the authentic driver, and a function activating means 13 for activating at least one function equipped in the vehicle, when the driver is certified as the authentic driver.

20 Claims, 15 Drawing Sheets

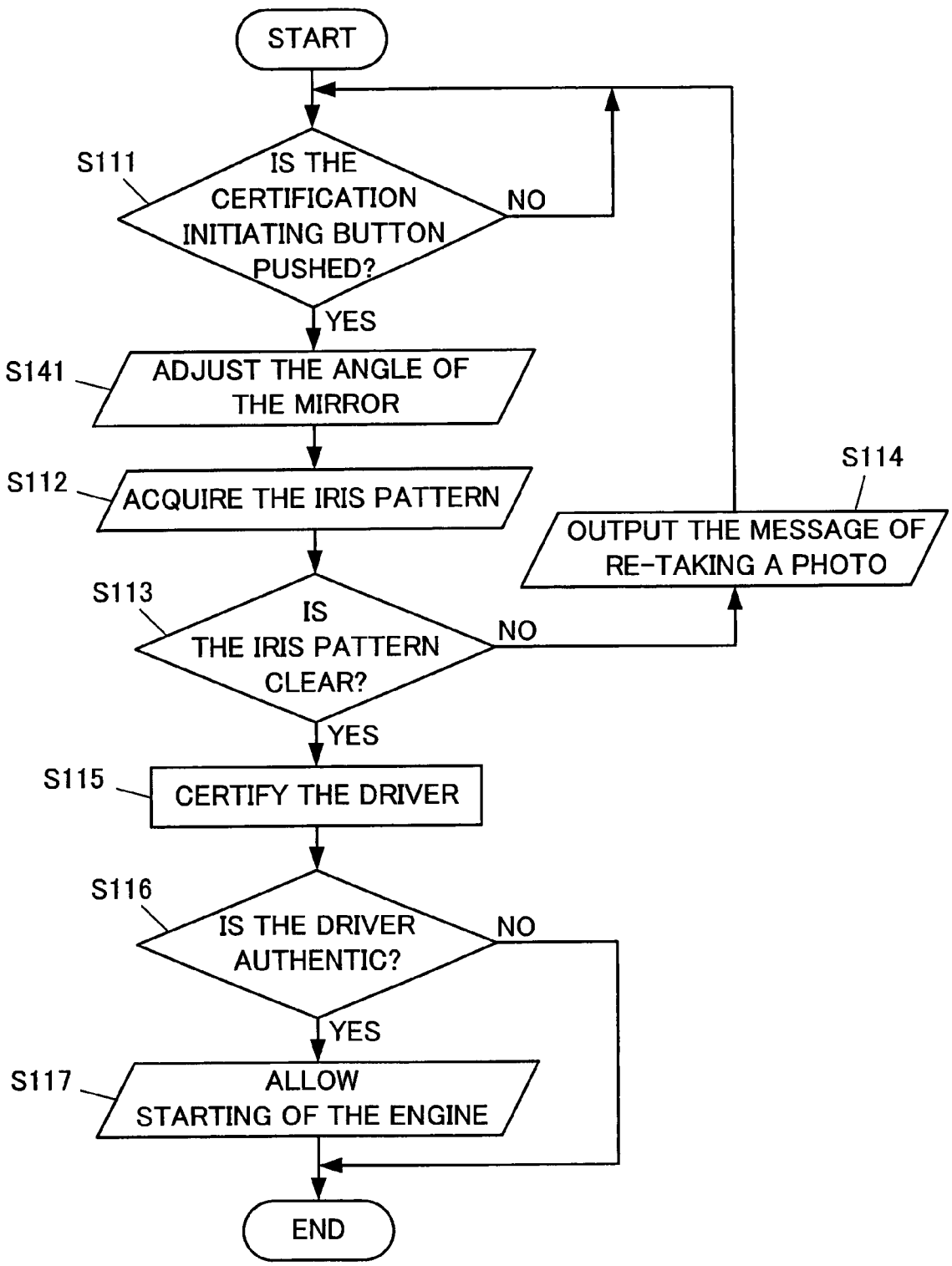

DRIVER CERTIFYING SYSTEM

BACKGROUND OF THE INVENTION

1. Field of the Invention

Figure 1:
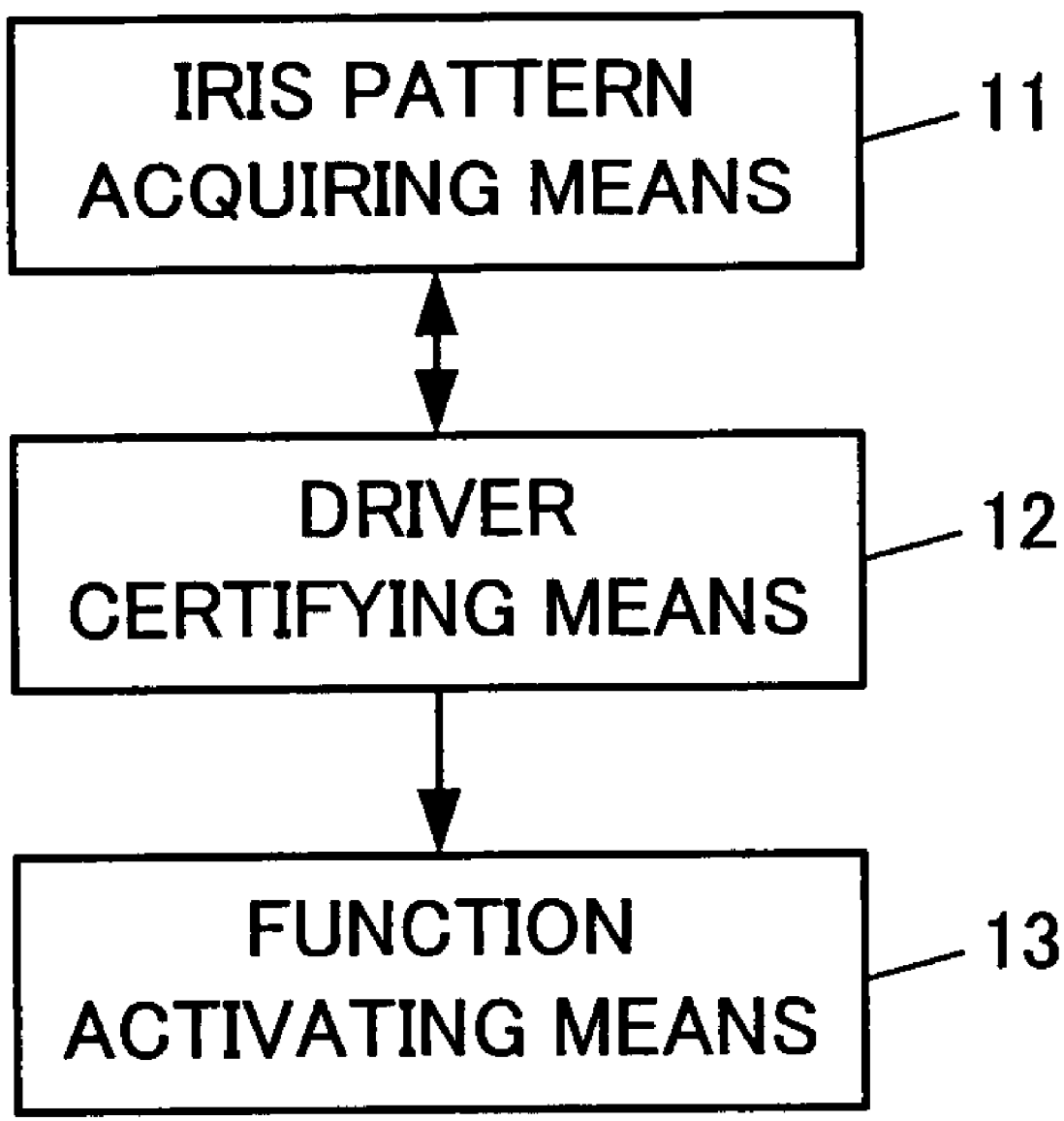

The present invention relates to a driver certifying system, especially to a driver certifying system certifying whether or not the driver is an authentic driver by using an iris pattern of the driver.

2. Description of the Related Art

Recently, a driver certifying system, which certifies whether or not a driver sitting on the driver's seat of a vehicle is an authentic driver, is equipped on the vehicle, in order to prevent the vehicle from being stolen (See, Japanese Unexamined Patent Publication (Kokai) No. 2000-168502).

The conventional driver certifying system equips a CCD camera for taking a photo of the driver's iris pattern in the instrument panel of the vehicle.

This configuration enables to compare an iris pattern taken by the CCD camera with a pre-registered iris pattern, when the driver looks at the instrument panel.

When the driver is certified as the authentic driver, an immobilizing system, or an ignition switch is activated.

The conventional driver certify system, however, has a problem easily influenced by light incident from the outside of the vehicle.

In other words, the conventional driver certifying system equips a CCD camera for taking the driver's iris pattern in the instrument panel. Therefore, it is difficult clearly to take a photo of the iris pattern, because light incident from the outside of the vehicle enters the CCD camera when the incident light illuminates the instrument panel.

SUMMARY OF THE INVENTION

It is, therefore, an object of the present invention to provide a driver certifying system which can clearly acquire an iris pattern of a driver without effect of light incident from the outside of a vehicle.

In accordance with a first aspect of the present invention, there is provided a driver certifying system, comprising: an iris pattern acquiring means for acquiring iris pattern of a driver who sits on a driver's seat of a vehicle; a driver certifying means for certifying whether or not the driver is an authentic driver by comparing the iris pattern with pre-registered iris pattern of the authentic driver, and a function activating means for activating at least one function of the vehicle, when the driver is certified as the authentic driver, wherein said iris pattern acquiring means is arranged in the ceiling of the vehicle.

The driver certifying system according to the present invention thus constructed as above mentioned can eliminate effect of light incident from the outside of the vehicle.

In accordance with a second aspect of the present invention, there is provided a driver certifying system, which further comprises a first distance adjusting means for adjusting a distance between the iris of said driver and said iris pattern acquiring means to the predetermined distance.

The driver certifying system according to the present invention thus constructed as above mentioned, the distance between the iris of the driver and said iris pattern acquiring means can be adjusted.

In accordance with a second aspect of the present invention, there is provided a driver certifying system, in which said iris pattern acquiring means is constituted by a camera which is arranged in the ceiling between the sun visor and the rear window, and brings the iris pattern of the driver into view.

The driver certifying system according to the present invention thus constructed as above mentioned can directly take the iris pattern of the driver with the camera.

The camera may be arranged in the ceiling between the sun visor and the rear window.

The camera may be arranged on the plane of a sun visor opposite to said driver's face.

In accordance with a second aspect of the present invention, there is provided a driver certifying system, which further comprises a second distance adjusting means for adjusting the distance between the driver and said camera to a predetermined distance by moving the driver seat, after the driver sits on the driver's seat, and before the iris pattern is acquired by said iris pattern acquiring means.

The driver certifying system according to the present invention thus constructed as above mentioned can clearly take the iris pattern of the driver with the iris pattern acquiring means.

In accordance with a second aspect of the present invention, there is provided a driver certifying system, in which said iris pattern acquiring means is constituted by an iris mirror which is arranged in the ceiling between the sun visor and the rear window, and brings the iris pattern of the driver into view, and a camera which brings said iris mirror into view.

The driver certifying system according to the present invention thus constructed as above mentioned can eliminate the effort of light incident from the outside of the vehicle on the iris pattern acquiring means The iris pattern acquiring means may be constituted by an iris minor which is arranged on the plane of a sun visor opposite to the driver, and brings the iris pattern of the driver into view, and a camera which brings said iris minor into view.

In accordance with a third aspect of the present invention, there is provided a driver certifying system, which further comprises a third distance adjusting means for adjusting the distance between the driver and said iris mirror to a predetermined distance by moving said iris mirror, after the driver sits on the driver's seat, and before the iris pattern is acquired by said iris pattern acquiring means.

The driver certifying system according to the present invention thus constructed as above mentioned can eliminate the effort of light incident from the outside of the vehicle on the iris pattern acquiring means In accordance with a third aspect of the present invention, there is provided a driver certifying system, in which said function-activating means activates an immobilizing system, which permits starting of the engine of the vehicle.

The driver certifying system according to the present invention thus constructed as above mentioned can certainly prevent a driver except an authentic driver from driving a vehicle.

In accordance with a fourth aspect of the present invention, there is provided a driver certifying system, in which said iris pattern acquiring means includes a certification initiating command-outputting unit for outputting a certification initiating command initialized by the driver to the camera.

The driver certifying system according to the present invention thus constructed as above mentioned can take the iris pattern, after a driver completes the driver's preparation.

In the driver certifying system according to the present invention, the certification initiating command-outputting unit is arranged on the ceiling just above the driver.

In the driver certifying system according to the present invention, the certification initiating command-outputting unit is arranged on the sidewall of the camera.

In the driver certifying system according to the present invention, the certification initiating command-outputting unit is arranged on the sidewall of the iris mirror.

BREIF DESCRIPTION OF THE DRAWINGS

Figure 5A:
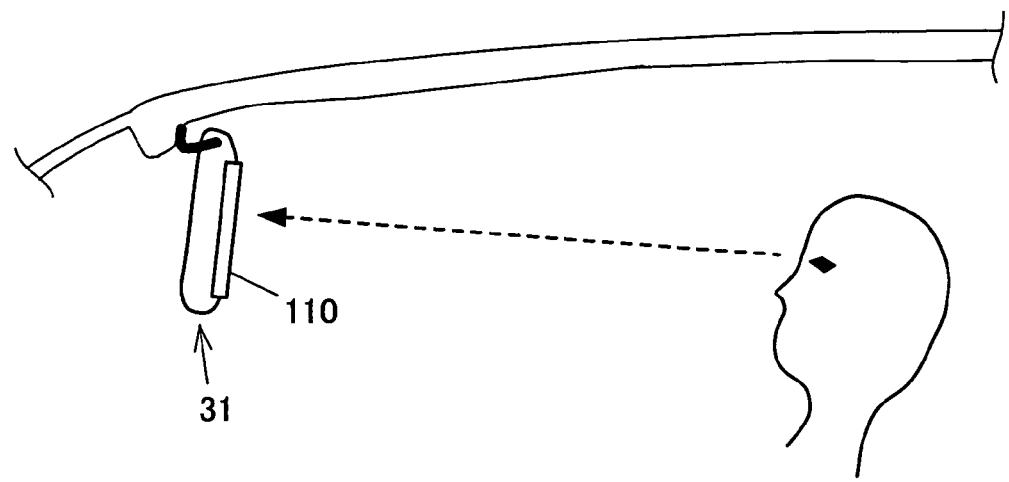
Figure 5B:
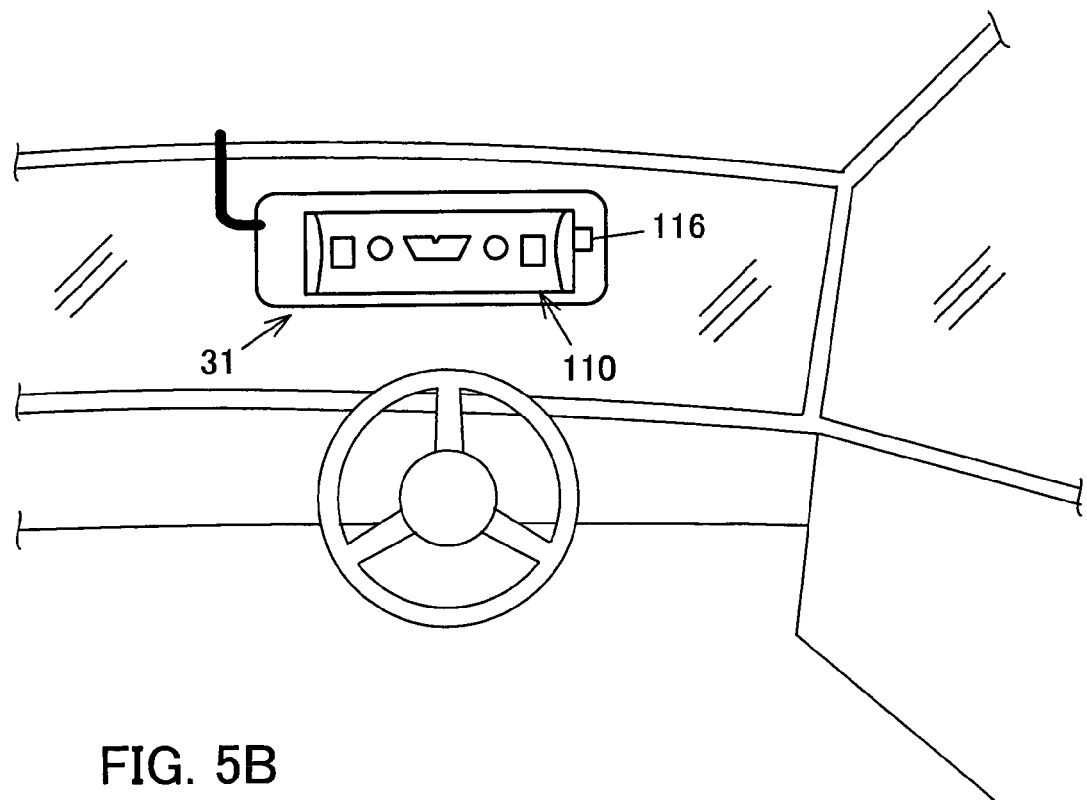
Figure 6:
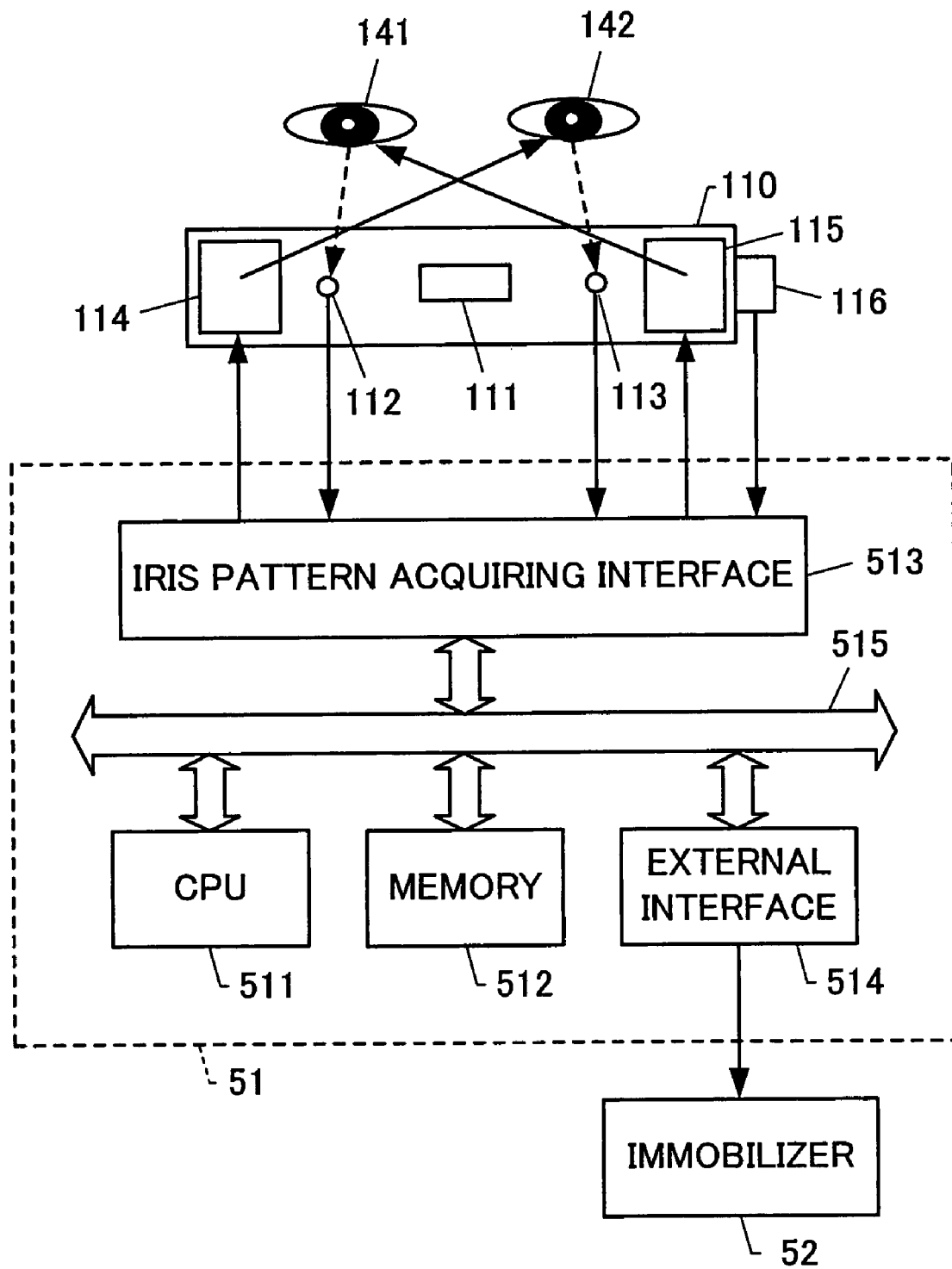
Figure 7:
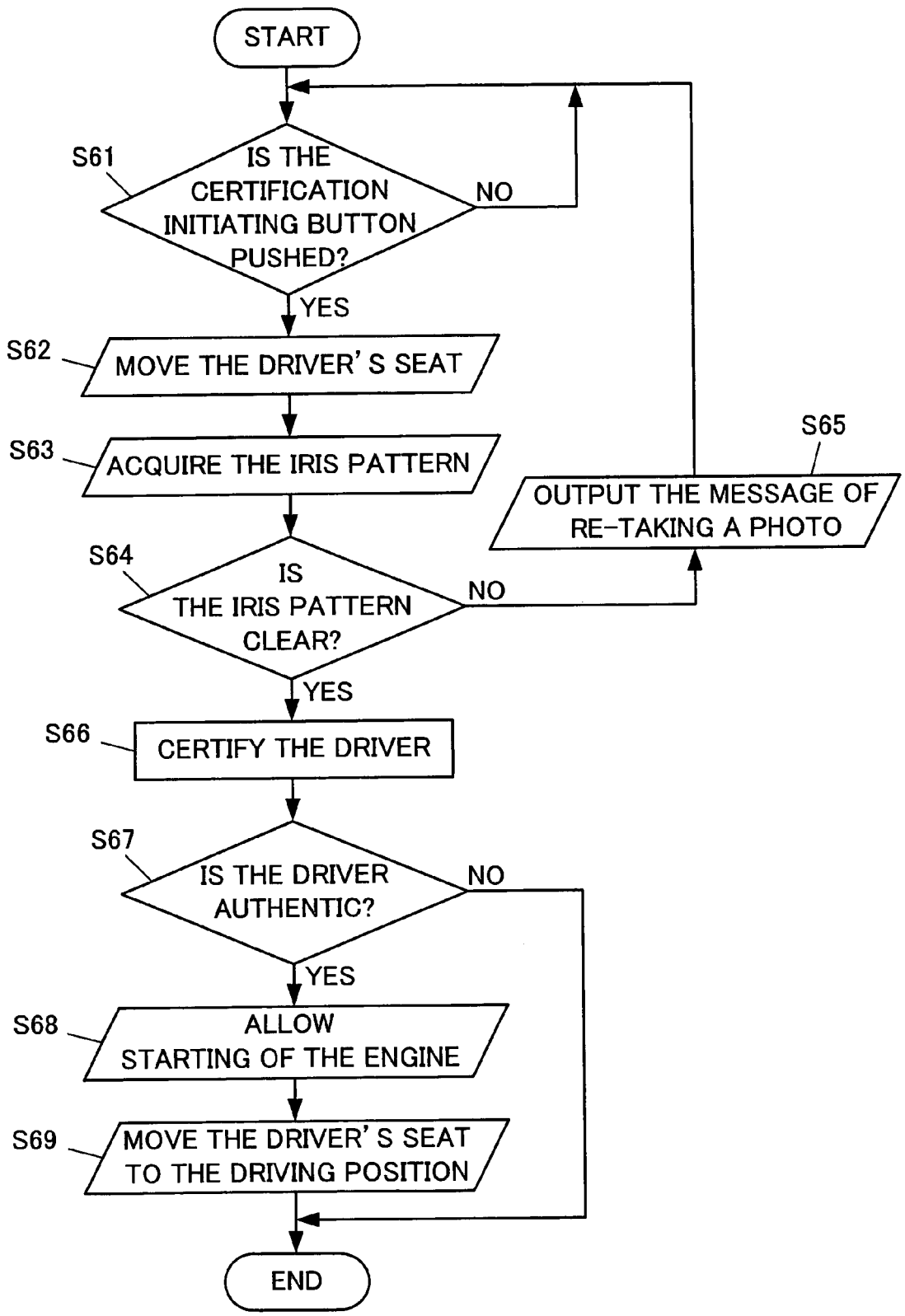
Figure 8A:
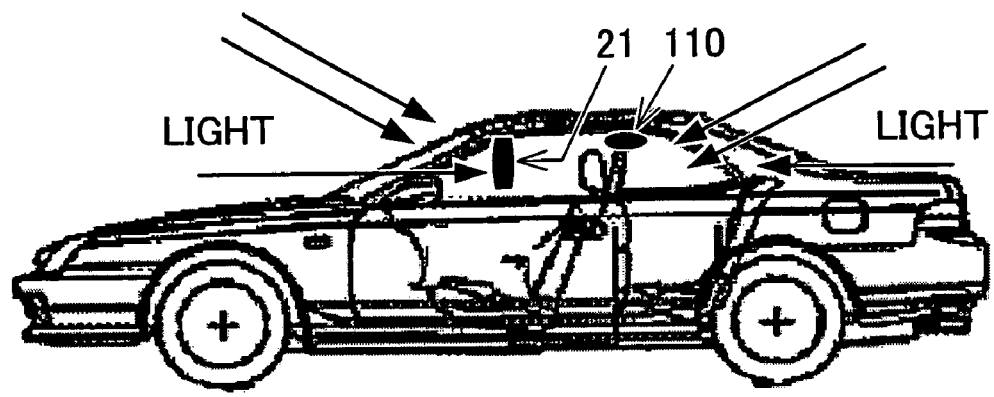
Figure 8B:
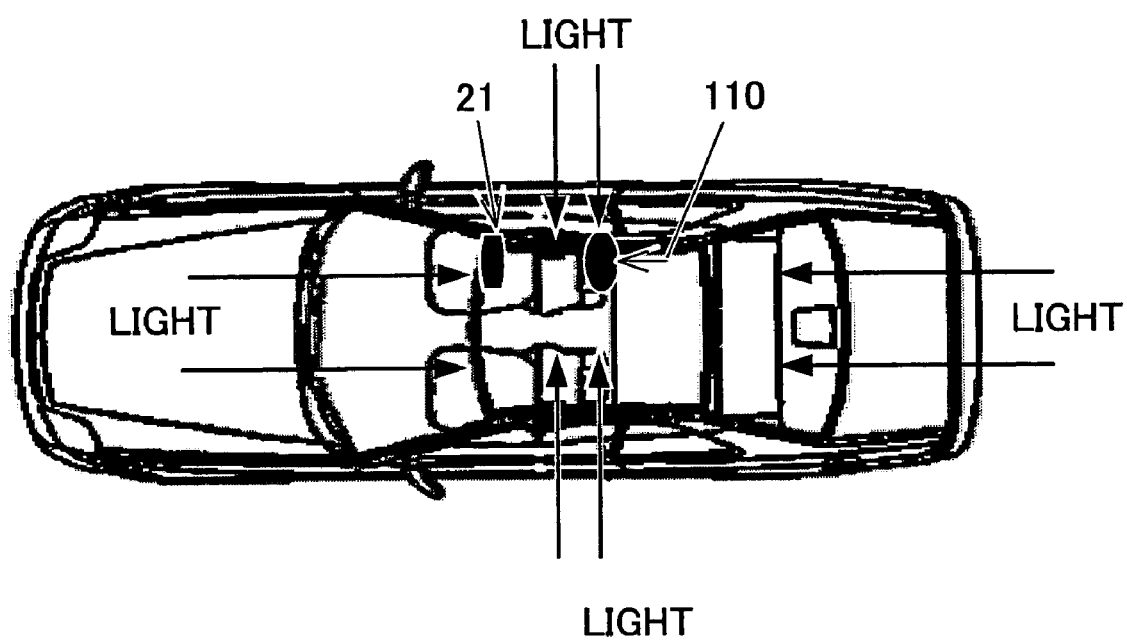
Figure 9:
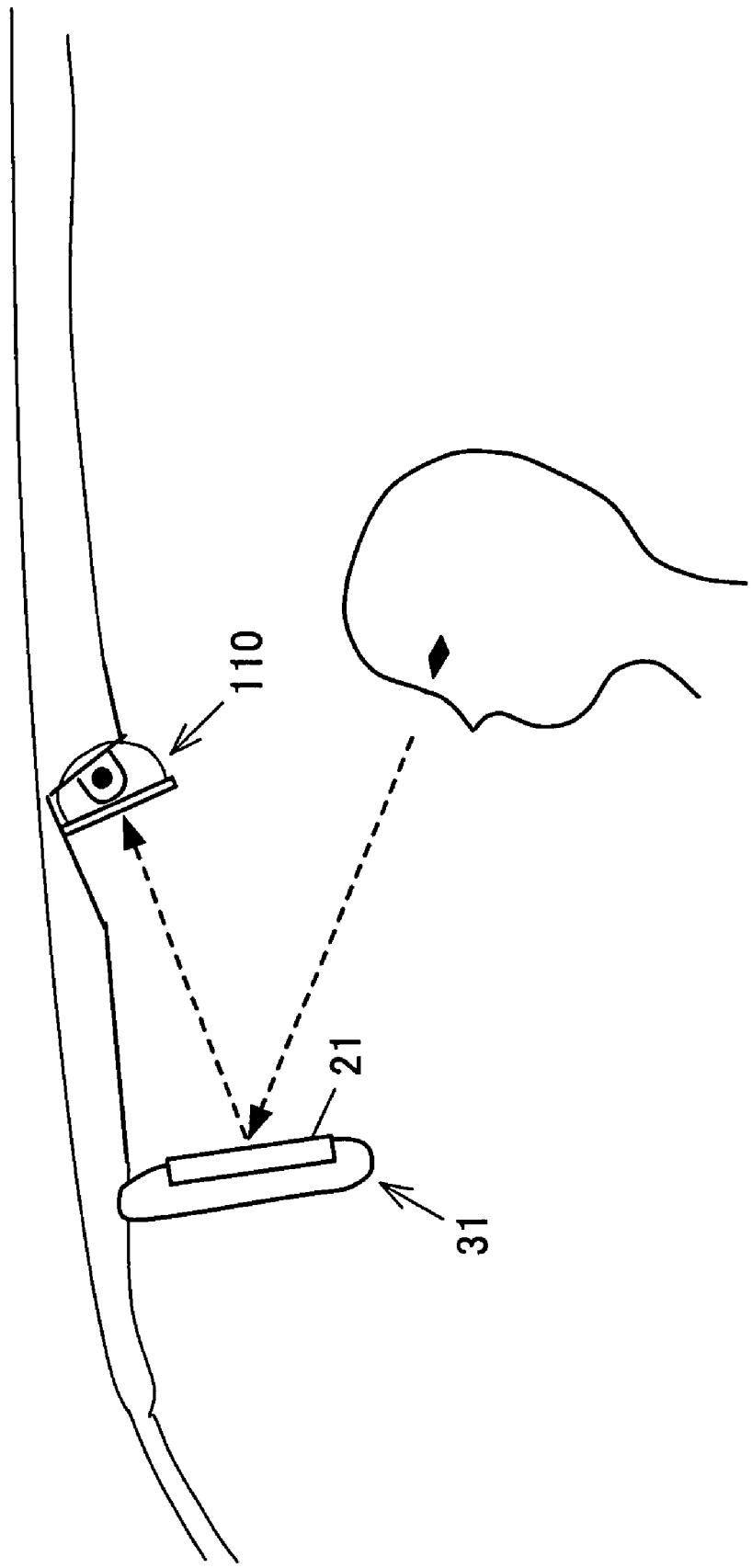
Figure 10:
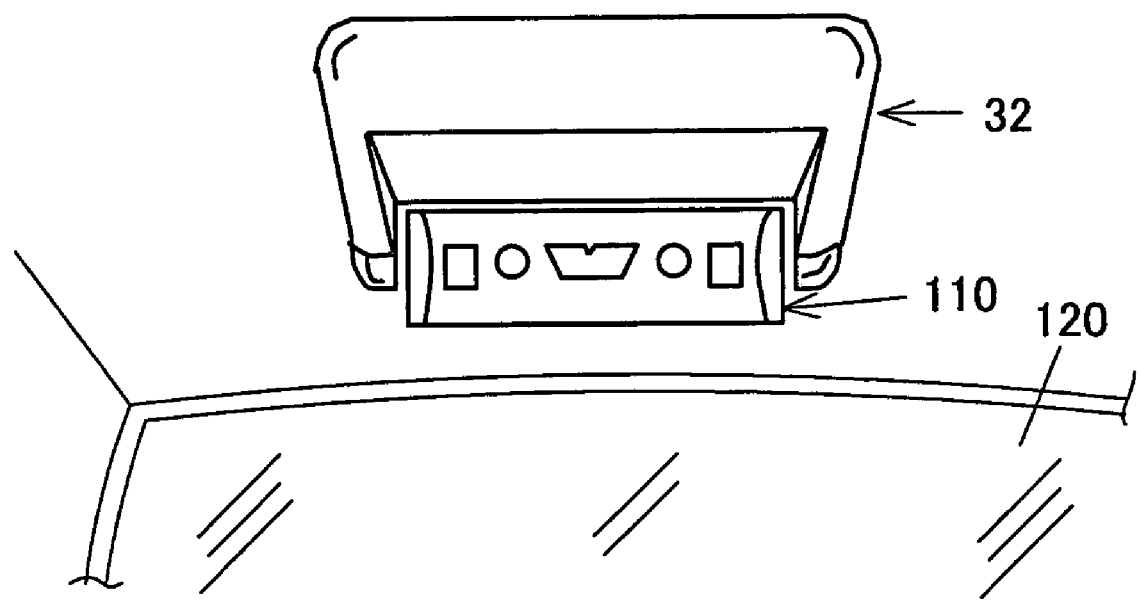
Figure 11:
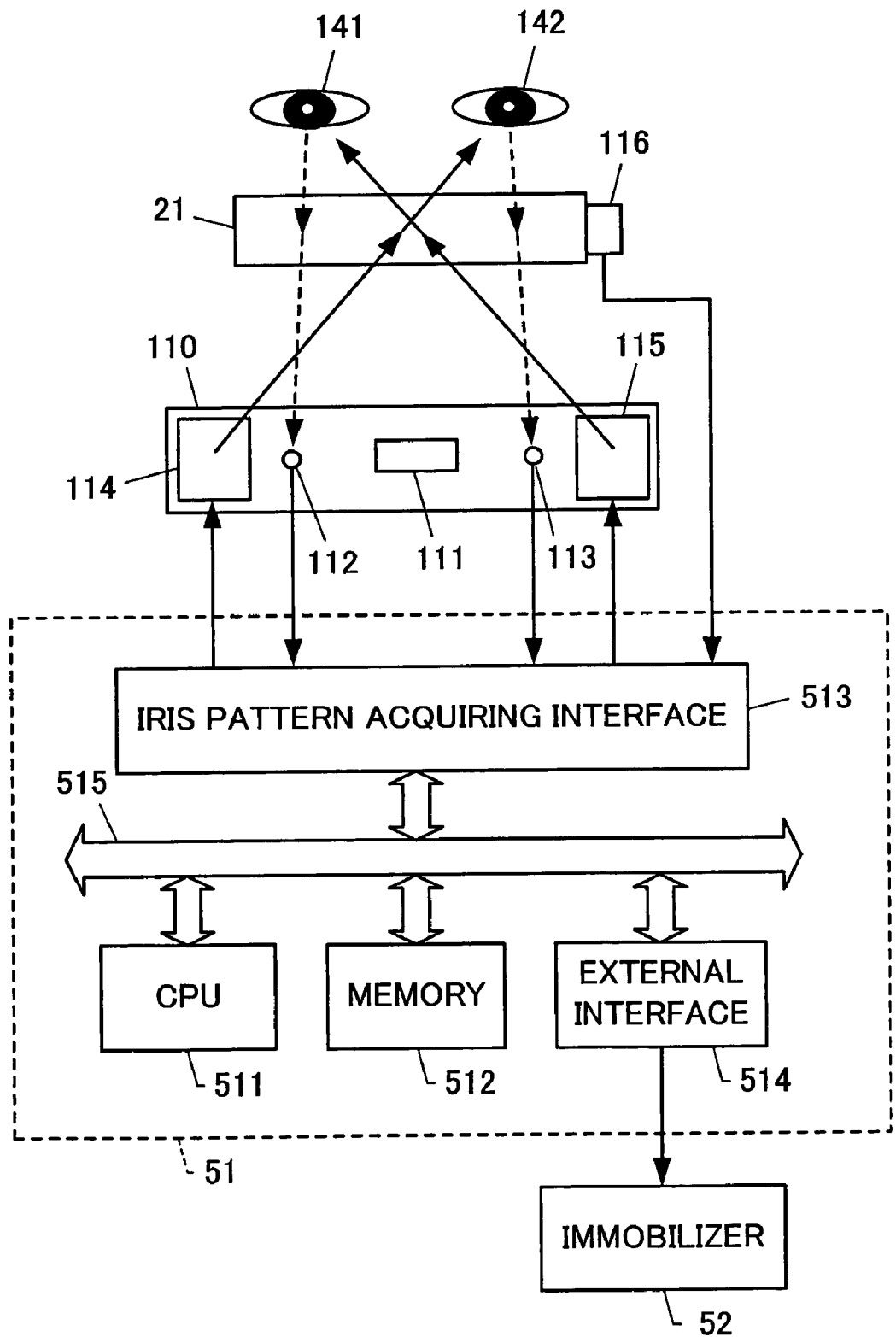
Figure 12:
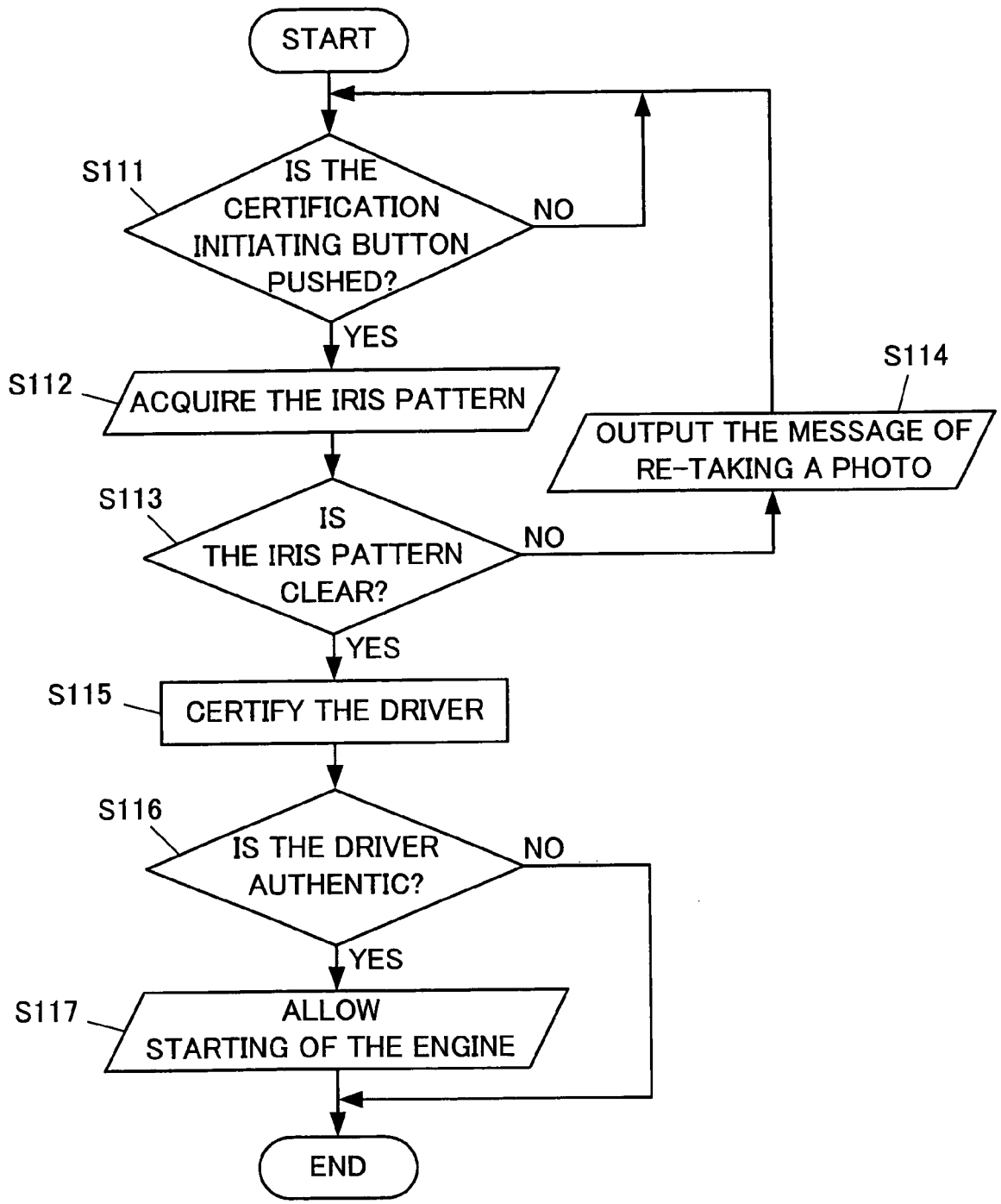
Figure 13:
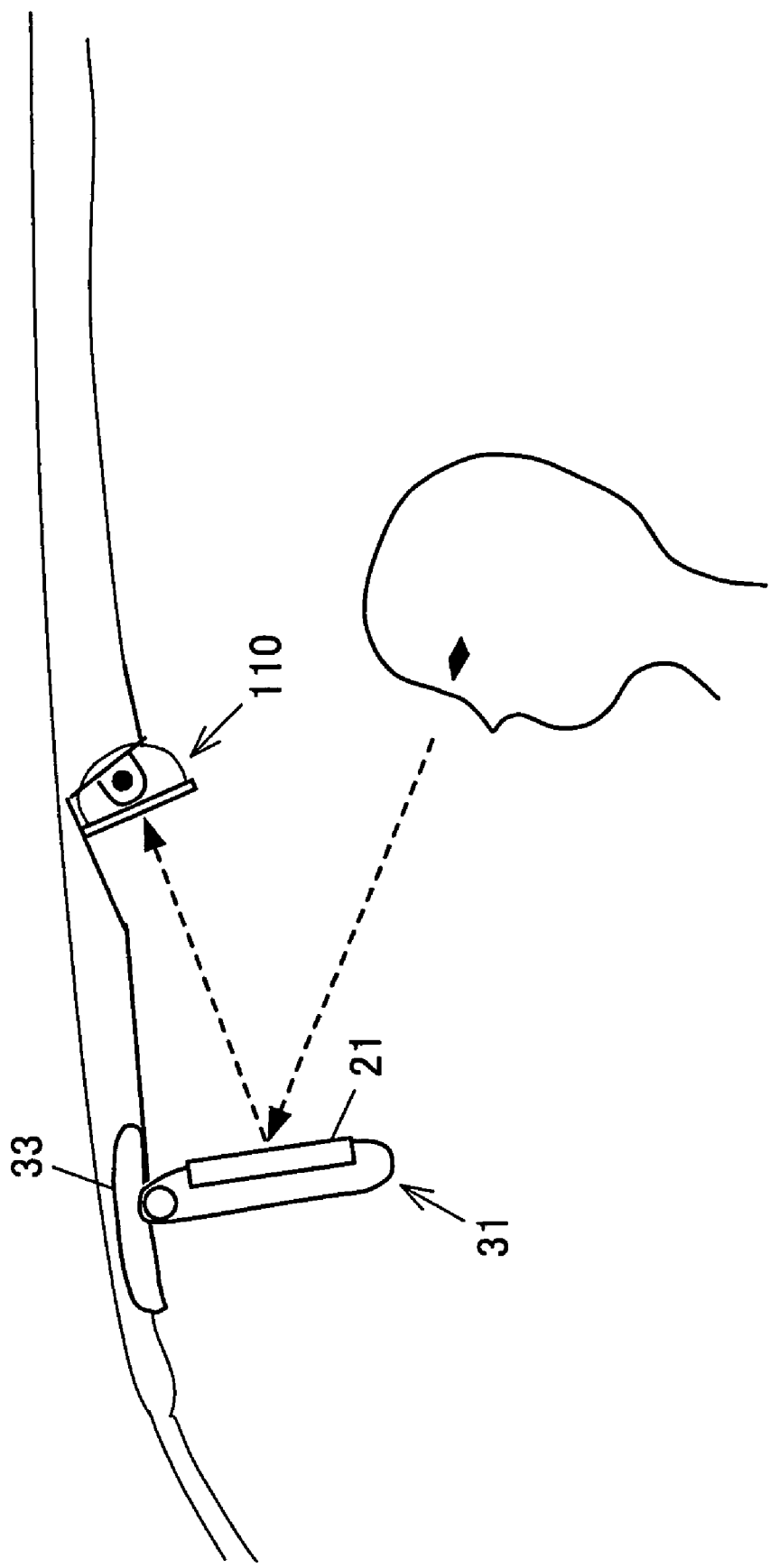
Figure 14:
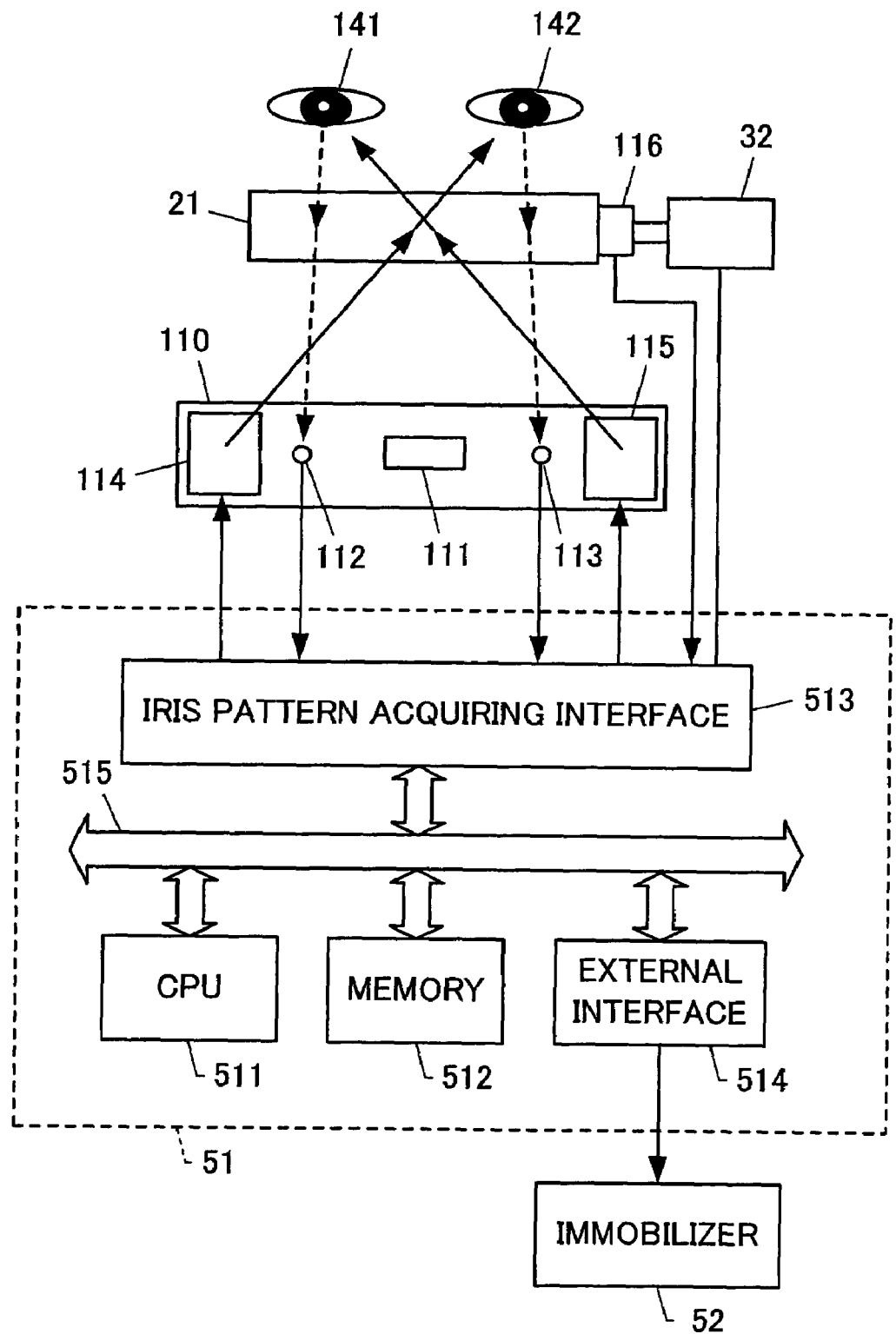

The present invention and many of the attendant advantages thereof will be better understood from the following detailed description when considered in connection with the accompanying drawings, wherein:

FIG. 1 is a block diagram of the driver certifying system according to the present invention, FIG. 2 is a layout drawing of the camera included in the driver certifying system of the first embodiment according to the present invention, FIG. 3 is a drawing explaining a first fitting status of the camera included in the driver certifying system according to the present invention, FIG. 4 is a drawing explaining an arrangement of a certification initiating button in the driver certifying system according to the present invention, FIG. 5 is a drawing explaining a second fitting status of the camera included in the driver certifying system according to the present invention, FIG. 6 is a hardware block diagram of the first embodiment of the driver certifying system according to the present invention, FIG. 7 is a flowchart explaining the operation of the first embodiment of the driver certifying system according to the present invention, FIG. 8 is a layout drawing of the iris mirror and the camera included in the second embodiment of the driver certifying system according to the present invention, FIG. 9 is a layout cross section drawing of the iris mirror and the camera included in the second embodiment of the driver certifying system according to the present invention, FIG. 10 is a drawing explaining a fitting status of the camera included in the driver certifying system of the second embodiment according to the present invention, FIG. 11 is a hardware block diagram of the second embodiment according to the present invention, FIG. 12 is a flowchart explaining the operation of the second embodiment of the driver certifying system according to the present invention, FIG. 13 is a layout drawing of the iris mirror and the camera included in the third embodiment of the driver certifying system according to the present invention, FIG. 14 is a hardware block diagram of the third embodiment according to the present invention, FIG. 15 is a flowchart explaining the operation of the third embodiment of the driver certifying system according to the present invention.

DESCRIPTION OF THE PREFERRED EMBODIMENTS

The embodiments of the driver certifying system according to the present invention will now be described with reference to the drawings.

The driver certifying system according to the present invention is shown in FIG. 1 to comprise an iris pattern acquiring means 11 for acquiring iris pattern of a driver who sits on a driver's seat of a vehicle, a driver certifying means 12 for certifying whether or not the driver is an authentic driver by comparing the iris pattern with registered iris pattern of the authentic driver, and a function activating means 13 for activating at least one function of the vehicle, when the driver is certified as the authentic driver.

Figure 2A:
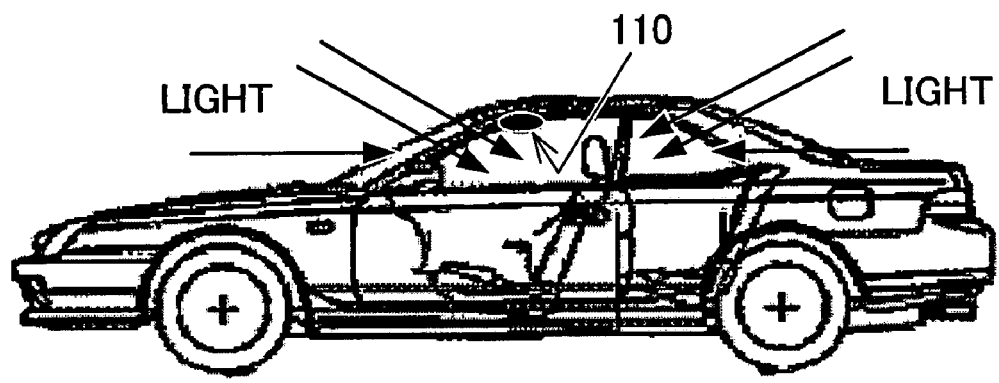
Figure 2B:
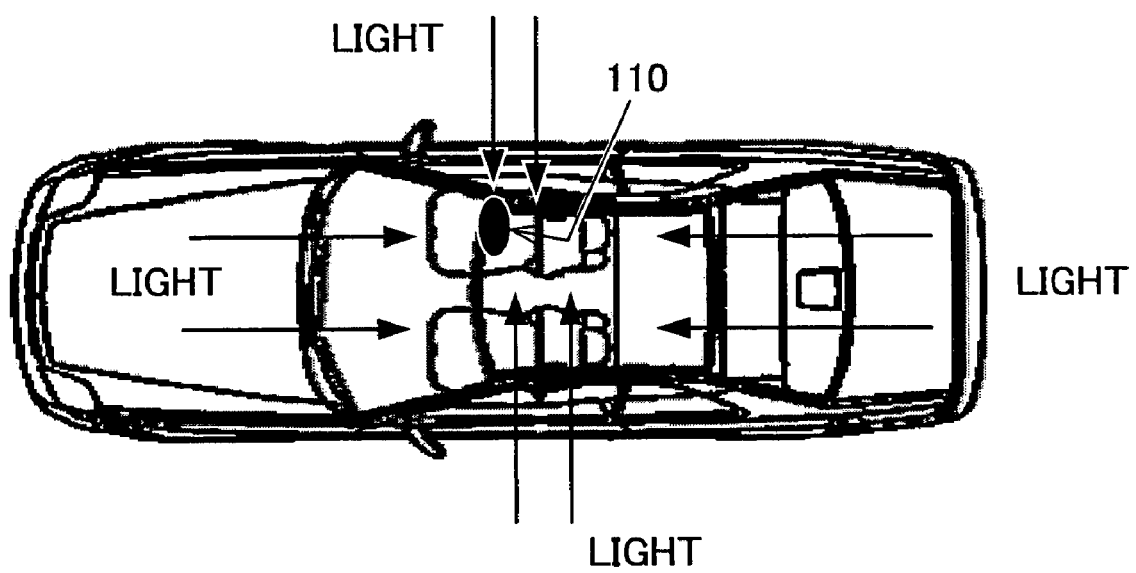

In the first embodiment of the iris pattern acquiring means 11 according to the present invention, the iris pattern acquiring means 11 is a camera arranged on the ceiling obliquely upward on the driver's seat of the vehicle, as shown in the side view of FIG. 2A and the top view of FIG. 2B. In the embodiment, it is supposed that the vehicle is one with a right-hand steering wheel.

At this point, a method for fitting the camera 110 is explained with reference to FIG. 3 and FIG. 5.

Figure 3A:
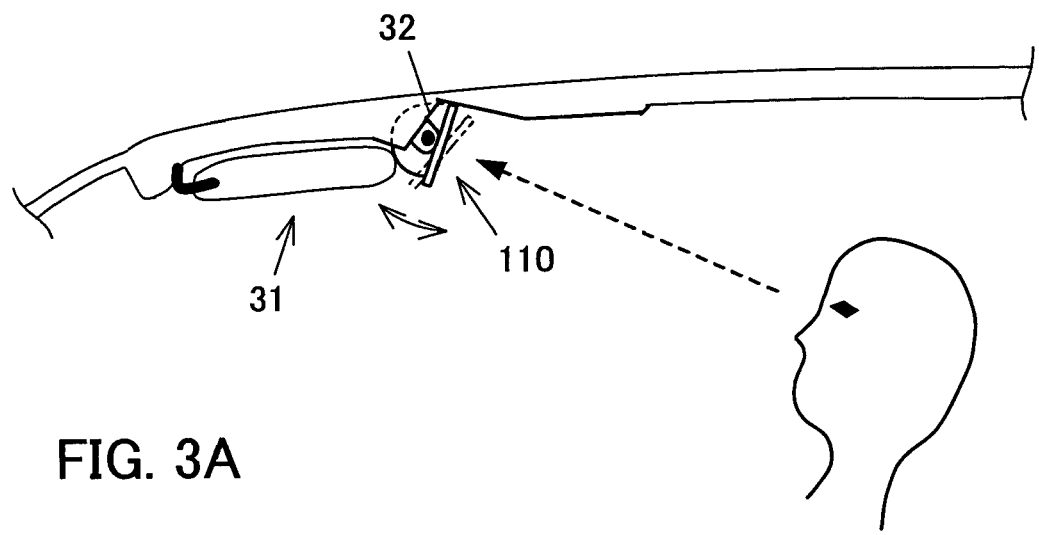
Figure 3B:
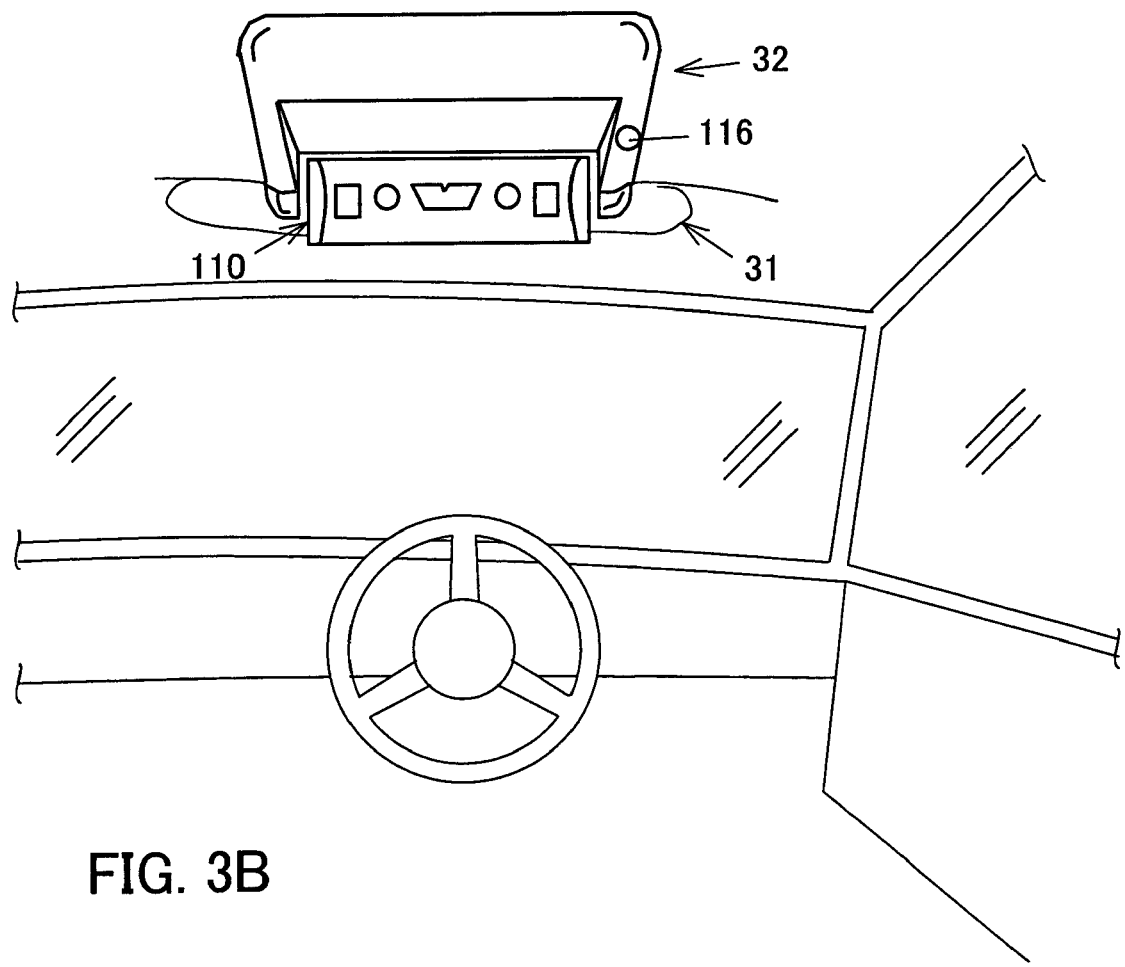

In the first fitting method, the camera 110 is arranged in a hollow 32 formed on the ceiling between the sun-visor 31 and the rear window 120, as shown in the side view of FIG. 3A and the front view of FIG. 3B.

It is preferable that the camera 110 is fit to be rotatable up and down so that the viewing angle of the camera 110 can be adjusted.

Further, a certification initiating button 116 working as the certification initiating command-outputting unit is arranged at the hollow 32 of the ceiling.

Figure 4A:
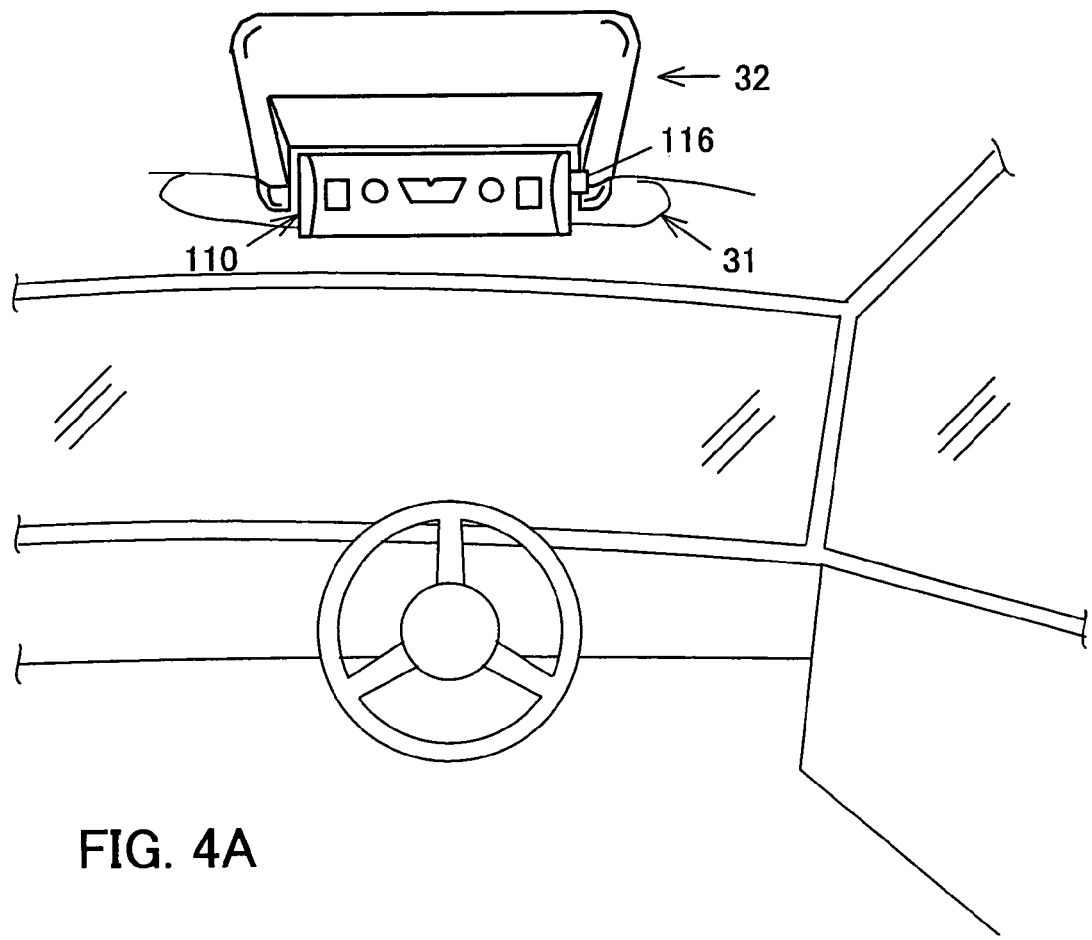
Figure 4B:
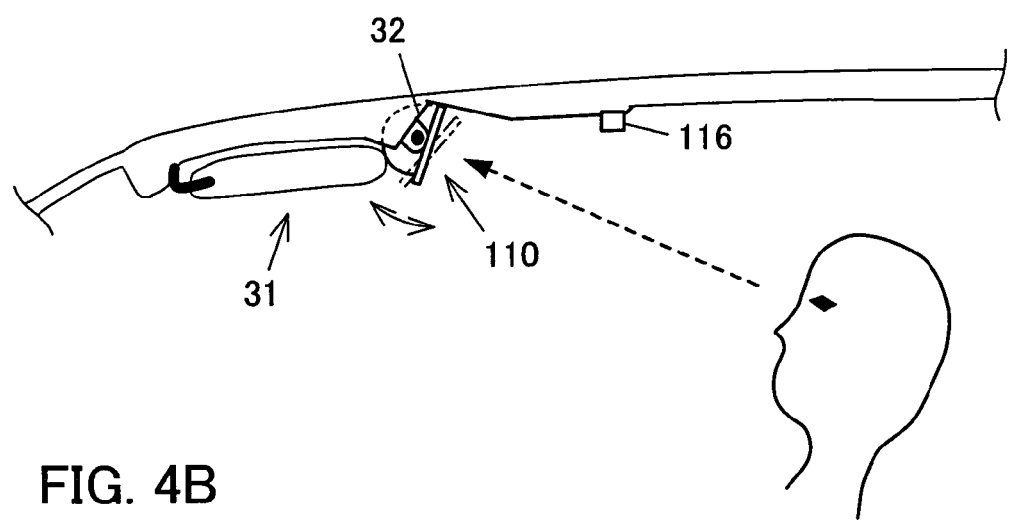

The certification initiating button 116 may be arranged on the sideboard of the camera 110 as shown in FIG. 4A, or on the ceiling above the driver as shown in FIG. 4B. In the embodiments explained below, the certification initiating button 116 is arranged on the sideboard of the camera 110.

In the second fitting method, the camera 110 is directly fit on the plane of the sun visor 31 opposite to the driver, as shown in the side view of FIG. 5A and the front view of FIG. 5B. In this method, it is not necessary that the camera 110 is fit to be rotatable, because the sun visor 31 is rotatable to the ceiling.

The hardware configuration of the first embodiment of the driver certifying system according to the present invention, is explained with reference to FIG. 6.

The camera 110 comprises a sighting mirror 111 which is a viewing target when the driver looks at the camera 110, a first CCD camera 112 and a second CCD camera 113 which catch the iris pattern of the driver, and a first infrared flash 114 and a second infrared flash 115. The camera 110, further, comprises a certification-initiating bottom 116 on the side of the camera 110 which functions as the certification initiating command-outputting unit.

The first CCD camera 112 takes one iris pattern of a first eye 141 of the driver sitting on the driver's seat, and the second CCD camera 113 takes another iris pattern of a second eye 142.

Meanwhile, the first infrared flash 114 illuminates the second eye 142 of the driver, and the second infrared flash 115 illuminates the first eye 141, so that it makes possible to clearly catch the iris pattern when the driver wears glasses.

The driver certifying means 12 and the function activating means 13 are realized by executing of program installed in ECU 51, and ECU 51 comprises a CPU 511, a memory 512, an iris pattern acquiring interface 513, and an external interface 514, a bus 515 which connects the preceding elements each other.

The iris pattern acquiring interface 513 is connected to the camera 110, and the external interface 514 is connected to at least one control apparatus (for example, an immobilizer) 52 which is mounted on the vehicle.

The operation of the first embodiment of the driver certifying system according to the resent invention is explained with reference to the flowchart of FIG. 6. The function activating means 13 is realized by executing of step S68, and the driver certifying means 12 is realized by executing of other steps.

CPU 511 remains idling operation until the driver sitting on the driver's seat pushes the certification initiating button 116 (step S61). When the driver pushes the certification-initiating bottom 116, the distance adjusting means contained in the driver certifying means 12 controls a power-seat system to move the driver's seat backward so that the camera 110 catches the eyes of the driver in the view field (step S62).

CPU 511 acquires the iris pattern by taking a photo of the driver's eyes with the first CCD camera 112 and the second CCD camera 113 while CPU 511 lights the first infrared flash 114 and the second infrared flash 115, after CPU 511 completes moving of the driver's seat (step S63).

CPU 511 judges whether or not the iris pattern caught by the first CCD camera 112 and the second CCD camera 113 is clear enough to certify the driver (step S64).

CPU 511 outputs the message of re-talking a photo (step S65) and returns the control to step S61 in order to take the iris pattern of the driver again, when CPU 511 determines that the iris pattern of the driver is not clear enough to certify the driver.

It is preferable for the driver to push the certification-initiating bottom 116, after confirming that the driver's eyes face the camera 110 by looking at the sighting mirror 111 arranged at the center of the camera 110, and adjusting the angle of the camera 110, when the message of re-taking a photo.

CPU 511 certifies whether or not the driver is an authentic driver by comparing the iris pattern of the driver with a pre-registered iris pattern of the authentic driver, when CPU 511 determined that the iris pattern of the driver is clear enough to certify the driver (step S66).

CPU 511 activates at least one function equipped on the vehicle (step S68), when CPU 511 certifies the driver as an authentic driver (step S67).

It is preferable that CPU 511 activates the immobilizer for controlling the start of the engine, in order to prevent the theft of vehicles.

It may be desirable that CPU 511 activates the car audio system or the emergency report system for automatically reporting information of the driver and passengers to an ambulance and rescue station.

CPU 511 completes its execution, after moving the driver's seat to the driving position (step S69).

On the contrary, CPU 511 directly completes its execution, and does not activate any functions equipped on the vehicle, when CPU 511 determines that the driver is not an authentic driver at step S67.

Therefore, it becomes possible to securely prevent the theft of the vehicle as the engine is not activated when the function activating means activate imobilizer.

In the case that the function activating means 13 controls the ignition switch, it is possible to prevent using the audio system or the navigation system, because the function activating means 13 allows the accessory switch to be turned on, when the driver is an authentic driver, and does not allow the accessory switch when the driver is not an authentic driver.

As described above, according to the first embodiment of the driver certifying system, it is possible to clearly acquire the iris pattern of the driver without any effect of light incident from the outside of the vehicle through the window, because the camera 110 working as the iris pattern acquiring means 11 is arranged on the ceiling obliquely upward on the driver seat of the vehicle.

In the second embodiment of the driver certifying system according to the present invention, the iris pattern acquiring means 11 comprises an iris mirror 21 which is arranged on the ceiling obliquely upward on the driver seat of the vehicle and brings the iris pattern of the driver into view, and the camera which brings the iris mirror 21 into view as shown in the side view of FIG. 8A and the top view of FIG. 8B. In the embodiment, it is supposed that the vehicle is one with a right-hand steering wheel.

At this point, a method for fitting the iris mirror 21 and the camera 110 is explained with reference to FIG. 9.

The iris mirror 21 is directly fit on the back surface of the sun visor 31, as shown in FIG. 9. In this method, it is not necessary that the iris mirror 21 is fit to be rotatable, because the sun visor 31 itself is rotatable to the ceiling. The iris mirror 21, further, comprises a certification-initiating bottom 116 on the side of the iris mirror 21.

Further, the camera 10 is arranged in a forward looking manner in a hollow 32 formed on the ceiling between the sun visor 31 and the rear window 120 as shown FIG. 10.

It is preferable that the camera 110 is fit to be rotatable up and down so that the viewing angle of the camera 110 can be adjusted.

FIG. 11 shows the hardware configuration of the second embodiment according to the present invention, but the hardware configuration is the same as that of the first embodiment except the iris mirror 21 reflects the iris pattern of the driver to the camera 110. Therefore, the further explanation is omitted.

At this point, the operation of the second embodiment of the driver certify system according to the present invention is explained with reference to the flowchart of FIG. 12.

The function activating means 13 is realized by executing of step S117, and the driver certifying means 12 is realized by executing of other steps.

CPU 511 remains idling operation until the driver sitting on the driver's seat pushes the certification-initiating bottom 116 (step S111).

When the driver pushes the certification-initiating bottom 116, CPU 511 acquires the iris pattern by taking a photo of the driver's eyes with the first CCD camera 112 and the second CCD camera 113 while CPU 511 lights the first infrared flash 114 and the second infrared flash 115 (step S112).

CPU 511 judges whether or not the iris patterns caught by the first CCD camera 112 and the second CCD camera 113 are clear enough to certify the driver (step S113).

CPU 511 outputs the message of re-taking a photo (step S114) and returns the control to step S111 in order to take the iris pattern of the driver again, when CPU 511 determines that the iris pattern of the driver is not clear enough to certify the driver.

It is preferable for the driver to push the certification-initiating bottom 116, after confirming that the driver's eyes face the camera 110 by looking at the sighting mirror 111 arranged at the center of the camera 110, and adjusting the angle of the iris mirror 21, when the message of re-taking a photo.

CPU 511 certifies whether or not the driver is an authentic driver by comparing the iris pattern of the driver with a pre-registered iris pattern of the authentic driver, when CPU 511 determined that the iris pattern of the driver is clear enough to certify the driver (step S115).

CPU 511 activates at least one function of the vehicle (step S116), when CPU 511 certifies the driver as an authentic driver (step S117).

On the contrary, CPU 511 directly completes its execution, and does not activate any functions equipped on the vehicle, when CPU 511 determines that the driver is not an authentic driver at step S116.

As described above, according to the second embodiment of the driver certifying system, it is possible to clearly acquire the iris pattern of the driver without any effect of light incident from the outside of the vehicle through the window, because the iris mirror 21 is arranged on the back surface of the sun visor 31, and ζ the camera 110 is arranged at the center of the ceiling of the vehicle.

In the third embodiment of the driver certifying system according to the present invention, the iris pattern acquiring means 11 comprises the iris mirror 21 and the camera 110, and the method for fitting the iris minor 21 and the camera 110 is the same as that of the second embodiment as shown in FIG. 13.

The iris mirror 21, however, is mounted on a position & angle adjusting device 33 to adjust the position and the angle of the iris mirror 21. The iris mirror 21, further, comprises a certification-initiating bottom 116 on the side of the iris mirror 21.

FIG. 14 shows the hardware configuration of the third embodiment according to the present invention, but the hardware configuration is the same as that of the second embodiment, except that the position and angle of the iris mirror 21 can be adjusted by the position & angle adjusting device 33. Therefore, the further explanation is omitted.

At this point, the operation of the third embodiment of the driver certifying system according to the present invention is explained with reference to the flowchart of FIG. 15.

The function activating means 13 is realized by executing of step S117, and the driver certifying means 12 is realized by executing of other steps.

CPU 511 remains idling operation until the driver sitting on the driver's seat pushes the certification-initiating bottom 116 (step S111).

When the driver pushes the certification-initiating bottom 116, CPU 511 activates the position and angle adjusting device 33 to adjust the position and angle of the iris mirror 21 (step S141).

CPU 511 acquires the iris pattern by taking a photo of the driver's eyes with the first CCD camera 112 and the second CCD camera 113 while CPU 511 lights the first infrared flash 114 and the second infrared flash 115 (step S112).

CPU 511 judges whether or not the iris pattern caught by the first CCD camera 112 and the second CCD camera 113 is clear enough to certify the driver (step S113).

CPU 511 outputs the message of re-taking a photo (step S65) and returns the control to step S111 in order to take the iris pattern of the driver again, when CPU 511 determines that the iris pattern of the driver is not clear enough to certify the driver.

In this case, CPU 511 activates the position and angle adjusting device 33 to adjust the position and angle of the iris mirror 21 (step S141).

The explanation of the other steps is omitted, because these steps are the same as those of the second embodiment.

As described above, according to the third embodiment of the driver certifying system, it is not necessary to adjust the position of the driver's seat, because the position and angle of the iris minor 21 is automatically controlled to take the iris pattern at an uniform size.

The certifying system according to the above embodiment, certifies the driver, but the certifying system according to the present invention may certify the passengers instead of the driver.

As described above, the driver certifying system according to the present invention has a beneficial effect on clearly taking an iris pattern of the driver without any effect of light incident from the outside of the vehicle, and is useful as the certifying system using the iris pattern.

What is claimed is:

1. A driver certifying system, comprising:
   an iris pattern acquiring means comprising two cameras, each one of the two cameras for acquiring an iris pattern of a respective eye of a driver who sits on a driver's seat of a vehicle;
   a driver certifying means for certifying whether or not the driver is an authentic driver by comparing at least one of the acquired iris patterns with a registered iris pattern of the authentic driver; and
   a function activating means for activating at least one function of the vehicle, when the driver is certified as the authentic driver, wherein
   said iris pattern acquiring means includes a camera which is arranged in a hollow formed on the vehicle ceiling between the sun visor and the rear window to acquire the iris pattern of the driver without effect of light incident from outside the vehicle.

2. The driver certifying system as set forth in claim 1, which further comprises;
   a first distance adjusting means for adjusting a distance between the iris of the driver and said iris pattern acquiring means.

3. The driver certifying system as set forth in claim 1, in which said iris pattern acquiring means includes a camera which is arranged on the plane of a sun visor opposite to the driver, and brings the iris pattern of the driver into view.

4. The driver certifying system as set forth in claims 1 or 3, which further comprises:
   a second distance adjusting means for adjusting a distance between the driver and said camera to a predetermined distance by moving the driver seat, after the driver sits on the driver's seat, and before the iris pattern is acquired by said iris pattern acquiring means.

5. The driver certifying system as set forth in claim 1, in which said iris pattern acquiring means includes an iris mirror which is arranged in the vehicle ceiling between the sun visor and the rear window, and brings the iris pattern of the driver into view, and a camera which brings said iris mirror into view.

6. The driver certifying system as set forth in claim 1, in which said iris pattern acquiring means includes an iris mirror which is arranged on the plane of a sun visor opposite to the driver, and brings the iris pattern of the driver into view, and a camera which brings said iris mirror into view.

7. The driver certifying system as set forth in claim 5 or 6, which further comprises:
   a third distance adjusting means for adjusting the distance between the driver and said iris mirror to a predetermined distance by moving said iris mirror, after the driver sits on the driver's seat, and before the iris pattern is acquired by said iris pattern acquiring means.

8. The driver certifying system as set forth in any one of claims 1, 2, 3, 5 or 6, in which said function-activating means activates an immobilizing system, which permits starting of an engine of the vehicle.

9. The driver certifying system as set forth in claim 4, in which said function-activating means activates an immobilizing system, which permits starting of an engine of the vehicle.

10. The driver certifying system as set forth in claim 7, in which said function-activating means activates an immobilizing system, which permits starting of an engine of the vehicle.

11. The driver certifying system as set forth in claims 1, 2, 3, 5 or 6, in which said iris pattern acquiring means includes a certification initiating command-outputting unit for outputting a certification initiating command initialized by the driver to the camera.

12. The driver certifying system as set forth in claim 4, in which said iris pattern acquiring means includes a certification initiating command-outputting unit for outputting a certification initiating command initialized by the driver to the camera.

13. The driver certifying system as set forth in claim 7, in which said iris pattern acquiring means includes a certification initiating command-outputting unit for outputting a certification initiating command initialized by the driver to the camera.

14. The driver certifying system as set forth in claims 1, 2, 3, 5 or 6, in which said iris pattern acquiring means includes a certification initiating command-outputting unit for outputting a certification initiating command initialized by the driver to the camera, and said certification initiating command-outputting unit is arranged on the vehicle ceiling overhead of the driver.

15. The driver certifying system as set forth in claim 4, in which said iris pattern acquiring means includes a certification initiating command-outputting unit for outputting a certification initiating command initialized by the driver to the camera, and in which said certification initiating command-outputting unit is arranged on the vehicle ceiling overhead of the driver.

16. The driver certifying system as set forth in claim 7, in which said iris pattern acquiring means includes a certification initiating command-outputting unit for outputting a certification initiating command initialized by the driver to the camera, and said certification initiating command-outputting unit is arranged on the vehicle ceiling overhead of the driver.

17. The driver certifying system as set forth in claims 1 or 2, in which said iris pattern acquiring means includes a certification initiating command-outputting unit for outputting a certification initiating command initialized by the driver to the camera, and in which said certification initiating command-outputting unit is arranged on the sidewall of the camera.

18. The driver certifying system as set forth in claim 5, in which said iris pattern acquiring means includes a certification initiating command-outputting unit for outputting a certification initiating command initialized by the driver to the camera, and said certification initiating command-outputting unit is arranged on the sidewall of said iris mirror.

19. The driver certifying system as set forth in claim 6, in which said iris pattern acquiring means includes a certification initiating command-outputting unit for outputting a certification initiating command initialized by the driver to the camera, and said certification initiating command-outputting unit is arranged on the sidewall of said iris mirror.

20. The driver certifying system as set forth in claim 5, in which said iris pattern acquiring means includes a certification initiating command-outputting unit for outputting a certification initiating command initialized by the driver to the camera, and said certification initiating command-outputting unit is arranged on the sidewall of said iris mirror.

* * * * *